United States Patent
Norris et al.

(10) Patent No.: US 11,409,669 B2
(45) Date of Patent: *Aug. 9, 2022

(54) MEMORY SPACE PROTECTION

(71) Applicant: Cylance Inc., Irvine, CA (US)

(72) Inventors: Michael Ray Norris, Reston, VA (US); Derek A. Soeder, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/031,616

(22) Filed: Sep. 24, 2020

(65) Prior Publication Data

US 2021/0011858 A1 Jan. 14, 2021

Related U.S. Application Data

(63) Continuation of application No. 15/638,114, filed on Jun. 29, 2017, now Pat. No. 10,824,572.

(60) Provisional application No. 62/385,819, filed on Sep. 9, 2016.

(51) Int. Cl.
| | |
|---|---|
| *G06F 12/14* | (2006.01) |
| *G06F 21/79* | (2013.01) |
| *G06F 21/62* | (2013.01) |

(52) U.S. Cl.
CPC ...... *G06F 12/1441* (2013.01); *G06F 12/1425* (2013.01); *G06F 21/6281* (2013.01); *G06F 21/79* (2013.01); *G06F 2212/1052* (2013.01)

(58) Field of Classification Search
CPC ............. G06F 12/1441; G06F 12/1425; G06F 21/6281; G06F 21/79; G06F 2212/1052
See application file for complete search history.

(56) References Cited

U.S. PATENT DOCUMENTS

| | | |
|---|---|---|
| 4,993,027 A | 2/1991 | McGraw |
| 7,228,266 B1 | 6/2007 | Sollom |
| 7,546,420 B1 | 6/2009 | Shar |
| 8,615,614 B2 | 12/2013 | Xu |
| 8,938,547 B1 | 1/2015 | Roberge |
| 9,317,452 B1 | 4/2016 | Forschmiedt |

(Continued)

OTHER PUBLICATIONS

Schmidt et al., "Pattern-oriented software architecture, patterns for concurrent and networked objects," vol. 2. John Wiley & Sons, 2013.

(Continued)

*Primary Examiner* — Ryan Bertram
(74) *Attorney, Agent, or Firm* — Jones Day

(57) ABSTRACT

Executable memory space is protected by receiving, from a process, a request to configure a portion of memory with a memory protection attribute that allows the process to perform at least one memory operation on the portion of the memory. Thereafter, the request is responded to with a grant, configuring the portion of memory with a different memory protection attribute than the requested memory protection attribute. The different memory protection attribute restricting the at least one memory operation from being performed by the process on the portion of the memory. In addition, it is detected when the process attempts, in accordance with the grant, the at least one memory operation at the configured portion of memory. Related systems and articles of manufacture, including computer program products, are also disclosed.

20 Claims, 7 Drawing Sheets

(56) References Cited

U.S. PATENT DOCUMENTS

| | | |
|---|---|---|
| 2004/0025040 A1 | 2/2004 | Aoki |
| 2006/0031679 A1 | 2/2006 | Soltis |
| 2008/0276051 A1 | 11/2008 | Renno |
| 2009/0204785 A1 | 8/2009 | Yates |
| 2009/0222491 A1 | 9/2009 | Larkin |
| 2011/0145531 A1 | 6/2011 | Kobayashi |
| 2012/0216281 A1 | 8/2012 | Uner |
| 2013/0125210 A1* | 5/2013 | Felt ............... G06F 21/6218 726/4 |
| 2014/0115706 A1 | 4/2014 | Silva |
| 2014/0123280 A1 | 5/2014 | Kedma |
| 2014/0169174 A1 | 6/2014 | Gilson |
| 2014/0173236 A1 | 6/2014 | Kegel |
| 2014/0184613 A1 | 7/2014 | Exterman |
| 2014/0189261 A1 | 7/2014 | Hildesheim |
| 2014/0244978 A1 | 8/2014 | King |
| 2015/0032996 A1 | 1/2015 | Koeberl |
| 2015/0121543 A1 | 4/2015 | Yang |
| 2015/0186659 A1* | 7/2015 | Leslie-Hurd ........ G06F 12/145 726/1 |
| 2015/0363597 A1 | 12/2015 | Levine-Fraiman |
| 2016/0182527 A1* | 6/2016 | Lietz ............... H04L 63/105 726/6 |
| 2016/0283402 A1 | 9/2016 | Schulz |
| 2016/0378693 A1 | 12/2016 | Sasaki |
| 2017/0060783 A1 | 3/2017 | Chiu |
| 2017/0076102 A1 | 3/2017 | Ishihara |
| 2017/0091125 A1 | 3/2017 | Adachi |
| 2019/0303574 A1 | 10/2019 | Lamay |

OTHER PUBLICATIONS

Non-Final Office Action issued for U.S. Appl. No. 15/638,114, dated Oct. 12, 2018 (17 pages).
Final Office Action issued for U.S. Appl. No. 15/638,114, dated Oct. 30, 2019 (18 pages).
Non-Final Office Action issued for U.S. Appl. No. 15/638,114, dated Apr. 16, 2019 (18 pages).
Non-Final Office Action issued for U.S. Appl. No. 15/638,114, dated Mar. 13, 2020 (19 pages).
Final Office Action issued for U.S. Appl. No. 15/638,114, dated Jan. 8, 2019 (19 pages).

* cited by examiner

MEMORY SPACE PROTECTION

RELATED APPLICATION

The current subject matter claims priority to U.S. patent application Ser. No. 15/638,114 filed on Jun. 29, 2017 which, in turn, claims priority to U.S. patent application Ser. No. 62/385,819, filed on Sep. 9, 2016, the contents of both of which are hereby fully incorporated by reference.

TECHNICAL FIELD

The subject matter described herein relates generally to computer security and more specifically to preventing the exploitation of executable memory space.

BACKGROUND

An operating system can allocate, to a process (e.g., an instance of a computer program that is being executed), a block or range of memory with different memory protection attributes. The memory protection attribute associated with a memory range may indicate the operations that a process is allowed to perform with respect to the memory range. For instance, allocating to the process a memory range with a read-write attribute allows the process to read instructions from and write instructions to the memory range. Alternately, allocating the memory range with a read-execute attribute allows the process to read and execute instructions from the memory range. Meanwhile, allocating the memory range with a read-write-execute attribute allows the process to write instructions to the memory range as well as to read and execute the instructions written to the memory range. The memory protection attribute that is initially allocated with the memory range may be subsequently changed, at the request of the process, to a different memory protection attribute.

SUMMARY

Systems, methods, and articles of manufacture, including computer program products, are provided for protecting executable memory space. In some example embodiments, there is provided a system that includes at least one processor and at least one memory. The at least one memory may include program code that provides operations when executed by the at least one processor. The operations may include: receiving, from a process, a request to configure a portion of memory with a memory protection attribute that allows the process to perform a memory operation on the portion of the memory; responding to the request with a grant; configuring the portion of memory with a reduced memory protection attribute that prohibits, contrary to the requested memory protection attribute, the memory operation from being performed by the process on the portion of the memory; and detecting when the process violates the reduced memory protection attribute by at least attempting, in accordance with the grant, the memory operation prohibited by the reduced memory protection attribute.

In some variations, one or more features disclosed herein including the following features can optionally be included in any feasible combination. The requested memory protection attribute may allow the process to read, write, and execute at the portion of memory. The reduced memory protection attribute may prohibit the process from executing at the portion of memory but may allow the process to read and write at the portion of memory. The process may violate the reduced memory protection attribute by at least attempting to execute at the portion of the memory. In response to detecting that the process violated the reduced memory protection attribute by at least attempting to execute at the portion of the memory, a determination may be made as to whether one or more instructions previously written by the process to the portion of memory are malicious or benign. The determining may include performing a scan of the portion of memory. The reduced memory protection attribute may be modified to prohibit the process from writing at the portion of memory but to allow the process to read and execute from the portion of memory, when the one or more instructions previously written by the process to the portion of memory are determined to be benign. The operations may include detecting when the process violates the reduced memory protection attribute by at least attempting to write at the portion of the memory. The attempt to write at the portion of the memory may result from executing the one or more instructions previously written by the process to the portion of memory. The process may exhibit self-modifying behavior when the execution of the one or more instructions previously written by the process to the portion of memory results in the attempt to write at the portion of the memory. In response to detecting that the process has violated the reduced memory protection attribute by at least attempting to write at the portion of the memory, the one or more instructions previously written by the process to the portion of memory may be emulated. The emulating of the one or more instructions may include: modifying the reduced memory protection attribute to allow the process to write at the portion of memory, the allowance enabling the process to generate a different instruction stream at the portion of memory; and determining whether the different instruction stream is malicious or benign. The reduced memory protection attribute may be modified to allow the process to read and execute at the portion of memory but to prohibit the process from writing at the portion of memory, when the different instruction stream is determined to be benign. Alternately or additionally, the process may be terminated, when the different instruction stream is determined to be malicious.

In some variations, the request may be a request to allocate the portion of memory with the requested memory protection attribute or a request to modify an existing memory protection attribute of the portion of memory to the requested memory protection attribute. The request may be sent from the process to an operating system, and the receiving of the request may include intercepting the request sent from the process. Configuring the portion of the memory with the reduced memory protection attribute may include sending, to the operating system, a different request to configure the portion of memory with the reduced memory protection. The different request may be sent to the operating system instead of the intercepted request. The detecting may include detecting a fault generated at the operating system indicating that the process violated the reduced memory protection attribute by at least attempting the memory operation prohibited by the reduced memory protection attribute.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
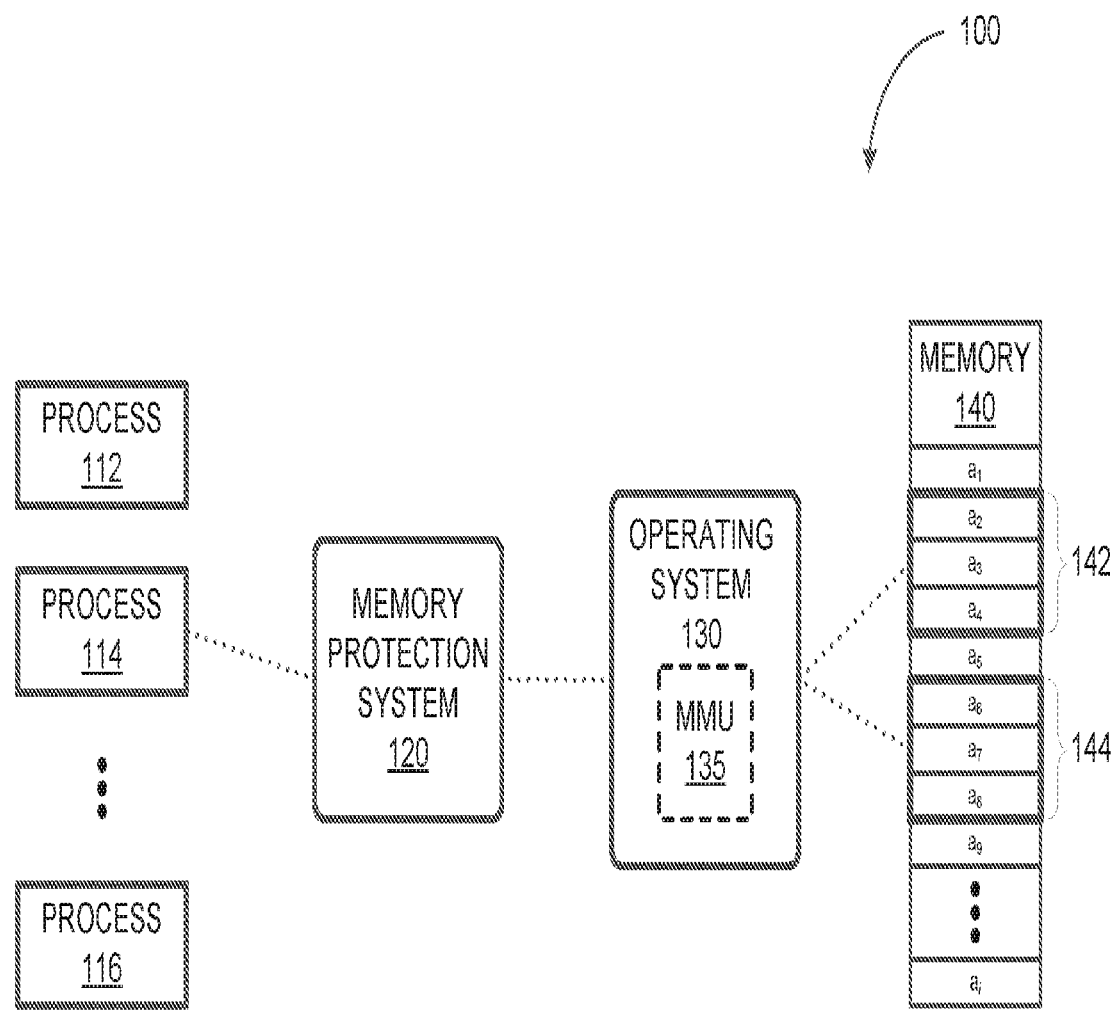
FIG. 1 depicts block diagram illustrating a computing environment, in accordance with some example embodiments.

When a process has read, write, and execute permission with respect to a memory range, that process may be allowed to write any instruction to the memory range and later overwrite these instructions with different instructions. The process may further be able to read and execute these instructions without triggering checks (e.g., scanning the memory range for the presence of malicious instructions) by the operating system. Thus, allocating a memory range with permission read-write-execute attribute and/or changing the memory protection attribute associated with the memory range to read-write-execute may allow a process to introduce and execute malicious instructions while evading detection.

For instance, self-modifying behavior may include executing instructions from a memory range that overwrites the same memory range with a different instruction stream. A program that exhibits self-modifying behavior may write one or more instructions to a memory range that, when executed, overwrites at least a portion of the same memory range. Giving read, write, and execute permission to a program that exhibits such self-modifying behavior may allow the program to initially write benign instructions to the memory range and then overwrite the benign instructions with malicious instructions. The self-modifying program may further be able to read and execute the malicious instructions without any intervention from the operating system.

In some example embodiments, a memory protection system may be configured to detect self-modifying behavior by limiting a process' ability to write instructions to and/or execute instructions from a memory range. For instance, a process may request an operating system to allocate or change the memory protection attribute associated with a memory range to read-write-execute. However, the memory protection system may intercept and modify the request such that the process has only read and write permission with respect to the memory range. According to some example embodiments, the process may be unaware of the modification and the resulting lack of permission to execute instructions from the memory range. As such, the process may write one or more instructions to the memory and then attempt to execute instructions from the memory range. Because the process lacks execute permission with respect to the memory range, the attempt to execute may cause a fault (e.g., memory access violation) at the operating system. In response to the fault, the memory protection system may determine whether the process has written malicious code to the memory range. For example, the memory protection system may determine whether the process has written, to the memory range, shellcode for starting a command shell that allows an attacker to control a compromised system. However, it should be appreciate that malicious code can include any type of code that causes undesirable behavior at the compromised system including, for example, adware, bots, bots, bugs, rootkits, spyware, Trojan horses, viruses, and worms.

In some example embodiments, the memory protection system may continue to monitor the behavior of the process even when the memory protection system determines that the process has not written any malicious code to the memory range. For example, the memory protection system may modify the memory protection attribute associated with the memory range to read-execute, when the memory protection system determines that the process has not written malicious code to the memory range. The process may be unaware of the lack of write permission. As such, the process may cause another fault, such as a memory access violation, when the process attempts to write, to the memory range, instructions that overwrite the non-malicious instructions that the process has previously written to the memory range. Thus, the memory protection system may determine, based on the fault, that the process exhibits self-modifying behavior. According to some example embodiments, the memory protection system may be configured to terminate a process that exhibits self-modifying behavior. Alternately or additionally, the memory protection system may determine whether the self-modifying behavior is malicious or benign by at least emulating the effects of the instructions from the memory range that overwrite the memory range upon execution.

FIG. 1 depicts a block diagram illustrating a computing environment 100, in accordance with some example embodiments. Referring to FIG. 1, a memory protection system 120 may be configured to intercept requests from a plurality of processes including, for example, a first process 112, a second process 114, and a third process 116. The requests may be destined for an operating system 130. Some of the plurality of requests may ask the operating system 130 to allocate one or more memory ranges from a memory 140 with different memory protection attributes including, for example, read, read and execute, read-write, and read-write-execute. Alternately or additionally, some requests may ask the operating system 130 to modify the memory protection attribute associated with one or more memory ranges from the memory 140. Meanwhile, some requests may ask the operating system 130 to perform one or more operations (e.g., read, write, execute) with respect to different memory ranges from the memory 140. In some example embodiments, the memory protection system 120 may intercept and/or modify the requests in order to detect self-modifying behavior in the first process 112, the second process 114, and/or the third process 116.

The operating system 130 may be configured to allocate memory ranges from the memory 140 with various memory protection attributes (e.g., read, read-write, read-execute, read-write-execute). The operating system 130 may also modify the existing memory protection attribute associated with the memory ranges from the memory 140. In addition, the operating system 130 may be configured to respond to requests to perform one or more operations including, for example, reading instructions, writing instructions, and executing instructions from a memory range in the memory 140.

For instance, as shown in FIG. 1, the operating system 130 may include a memory management unit 135 configured to respond to requests for memory allocation (e.g., from the memory protection system 120) by at least allocating, to a process making the request, a memory range from the memory 140. Allocating the memory range may change the memory range from being in an uncommitted state to a committed state. Moreover, the memory management unit 135 may be further configured to allocate, to the process, the memory range with the memory protection attribute specified in the request. Alternately or additionally, the operating system 130 may also respond to subsequent requests from the process to change the memory protection attribute associated with the memory range. For example, the process may request to change the memory protection attribute associated with the memory range from one type of permission (e.g., read-write) to another type of permission (e.g., read-write-execute) such that the process may be allowed to perform different and/or additional operations with respect to the memory range.

Referring again to FIG. 1, the memory 140 may include a sequence of storage locations (e.g., bytes), which may each assigned a corresponding memory address. As shown in FIG. 1, the memory 140 may include a sequence of individual memory addresses $\alpha_1$ to $\alpha_i$. When a process (e.g., the first process 112, the second process 114, the third process 116) requests for an allocation of a memory range, the operating system 130 may be configured to allocate a memory range that includes a range of memory addresses such that the process may read from, write to, and/or execute instructions stored at the memory addresses in that memory range. For example, the memory 140 may include a first memory range 142 and a second memory range 144. The first memory range 142 may include storage locations that are assigned with the memory addresses $\alpha_2$, $\alpha_3$, and $\alpha_4$. Meanwhile, the second memory range 144 may include storage locations that are assigned with the memory addresses $\alpha_6$, $\alpha_7$, and $\alpha_8$. If the second process 114 is allocated the first memory range 142, then the second process 114 may be able to read instructions from, write instructions to, and/or execute instructions stored at memory addresses $\alpha_2$ through $\alpha_4$.

According to some example embodiments, the memory protection system 120 may be configured to receive, from a process, a request to configure a portion of memory with a memory protection attribute that allows the process to perform a memory operation on that portion of the memory. For example, as shown in FIG. 1, the memory protection system 120 may receive, from the second process 114, a request to configure the first memory range 142 with a read-write-execute memory protection attribute that allows the second process 114 to read, write, and execute from the first memory range 142. The memory protection system 120 may intercept the request, which is intended for the operating system 130.

In some example embodiments, instead of configuring the first memory range 142 with the read-write-execute memory protection attribute requested by the second process 114, the memory protection system 120 may configure the first memory range 142 with a reduced memory protection attribute that prohibits a memory operation (e.g., write or execute) that is allowable under the memory protection attribute requested by the second process 114. Specifically, the memory protection system 120 may configure the first memory range 142 with a read-write memory protection attribute that prohibits the second process 114 from executing from the first memory range 142. Alternately or additionally, the memory protection system 120 may configure the first memory range 142 with a read-execute memory protection attribute that prohibits the second process 114 from writing to the first memory range 142.

In some example embodiments, the memory protection system 120 may respond to the request from the second process 114 with a grant. The memory protection system 120 may respond with the grant instead of the operating system 130 such that the second process 114 remains unaware of the interception of the request and the configuration of the first memory range 142 with the reduced memory protection attribute. For example, in some example embodiments, the memory protection system 120 may respond to the request from the second process 114 with a grant that includes a pointer to the first memory range 142. This grant may provide a false indication to the second process 114 that the first memory range 142 has been configured with the memory protection attribute requested by the second process 114 when the first memory range 142 is actually configured with the reduced memory protection attribute.

In some example embodiments, the memory protection system 120 may be configured to determine when the second process 114 violates the reduced memory protection attribute of the first memory range 142. Because the memory protection system 120 has responded to the second process 114 with the grant, that the first memory range 142 is actually configured with the reduced memory protection attribute may be transparent to the second process 114. As such, the second process 114 may attempt memory operations allowable under the requested memory protection attribute but prohibited by the reduced memory protection attribute of the first memory range 142. In doing so, the second process 114 may cause a fault at the operating system 130 (e.g., memory access violation). For instance, the memory protection system 120 may detect a fault at the operating system 130 (e.g., memory access violation), when the second process 114 attempts a write operation that is prohibited by the reduced memory protection attribute of the first memory range 142. Alternately or additionally, the memory protection system 120 may detect a fault at the operation system 130 (e.g., memory access violation), when the second process attempts an execute operation that is prohibited by the reduced memory protection attribute of the first memory range 142. In response to the detection of the attempt by the second process 114 to perform a prohibited memory operation (e.g., write, execute), the memory protection system 120 may determine whether the second process 114 exhibits any malicious behavior (e.g., malicious self-modifying behavior).

To further illustrate, in some example embodiments, the memory protection system 120 may intercept a request from the second process 114 that asks the operating system 130 to allocate, to the second process 114, the first memory range 142 from the memory 140. The request may further ask the operating system 130 to configure the first memory range 142 with a read, read-write, read-execute, or read-write-execute memory protection attribute. Alternately, in some example embodiments, the request may ask the operating system 130 to modify the existing memory protection attribute associated with the first memory range 142.

In some example embodiments, the memory protection system 120 may scan the first memory range 142 if the memory protection system 120 determines that the second process 114 is requesting to have read and execute permission with respect to the first memory range 142. Alternately or additionally, the memory protection system 120 may cause the operating system 130 to perform a scan of the first memory range 142 in the event that the second process 114 is requesting to have read and execute permission with respect to the first memory range 142.

The memory protection system 120 may determine, based on a result of the scan, whether the second process 114 should be allowed to have read and execute permission with respect to the first memory range 142. For instance, the result of the scan may indicate that the instructions in the first memory range 142 are benign. Accordingly, the memory protection system 120 may forward, to the operating system 130, the request from the second process 114, thereby allowing the second process 142 to have read and execute permission with respect to first memory range 142.

According to some example embodiments, the memory protection system 120 may also modify an intercepted request from the second process 114 if the memory protection system 120 determines that the request asks for read, write, and execute permission with respect to the first memory range 142. For example, the memory protection system 120 may modify the request and forward, to the operating system 130, a modified request that asks the operating system 130 for only read and write permission with respect to the first memory range 142.

Alternately or additionally, the memory protection system 120 may forward an intercepted request to the operating system 130 without any modification when the memory protection system 120 determines that the request asks the operating system 130 read only permission or read and write permission with respect to the first memory range 142. The memory protection system 120 may also forward an intercepted request to the operating system 130 without any modification when the request asks the operating system 130 to perform one or more operations with respect to the first memory range 142 including, for example, reading instructions from the first memory range 142, writing instructions to the first memory range 142, and executing instructions from the first memory range 142. The operating system 130 may generate a fault if the request to read, write, or execute is inconsistent with the memory protection attribute associated with the first memory range 142 (e.g., memory access violation).

In some example embodiments, the memory protection system 120 may intercept and modify a request from the second process 114 in a manner that is transparent to the second process 114. For example, the memory protection system 120 may modify the request from the second process 114 such that the first memory range 142 is allocated with only read and write permission instead of with read, write, and execute permission. However, the second process 114 may remain unaware of the lack of execute permission with respect to the first memory range 142. As such, the second process 114 may write to the first memory range 142, and subsequently attempt to read and execute the instructions from the first memory range 142. The attempt by the second process 114 to execute instructions from the first memory range 142 may cause a fault (e.g., a memory access violation) at the operating system 130.

According to some example embodiments, the memory protection system 120 may be configured to detect the fault caused when the second process 114 attempts to execute, without permission, instructions from the first memory range 142. In response to detecting the exception, the memory protection system 120 may be configured to perform an inspection (e.g., scan) the first memory range 142 to verify whether the second process 114 had written malicious instructions (e.g., shellcode) to the first memory range 142. Alternately or additionally, the memory protection system 120 may cause the operating system 130 to inspect (e.g., scan) the first memory range 142 for the presence of malicious instructions.

In some example embodiments, the memory protection system 120 may determine that the second process 114 did not write malicious instructions to the first memory range 142. As such, the memory protection system 120 may allow the second process 114 to execute the instructions from the first memory range 142 by modifying the memory protection attribute associated with the first memory range 142 to include execute permission. However, the memory protection system 120 may continue to monitor the second process 114 for self-modifying behavior. For instance, the memory protection system 120 may modify the memory protection attribute associated with the first memory range 142 to read-execute. Accordingly, while the second process 114 may be able to execute the benign instructions already written to the first memory range 142, any attempt by the second process 114 to overwrite the benign instructions by requesting the operating system 130 to write to the first memory range 142 may cause a fault at the operating system 130. This fault at the operating system 130 may indicate to the memory protection system 120 that the second process 114 exhibits self-modifying behavior.

In some example embodiments, the memory protection system 120 may terminate the second process 114 when the memory protection system 120 determines that the second process 114 exhibits self-modifying behavior. Alternately or additionally, when the second process 114 is determined to exhibit self-modifying behavior, the memory protection system 120 may respond by determining whether the self-modifying behavior of the second process 114 is malicious or benign. The memory protection system 120 may determine whether the self-modifying behavior exhibited by the second process 114 is malicious or benign by at least emulating the effects of one or more instructions that the second process 114 has previously written to the first memory range 142. These instructions may overwrite at least a portion of the first memory range 142 when executed. For example, the memory protection system 120 may emulate these instructions by allowing the instructions to execute, thereby overwriting the first memory range 142 with a different instruction stream. The memory protection system 120 may scan and/or cause a scan of the first memory range 142 to determine if any malicious instructions are present in the different instruction stream.

Figure 2:
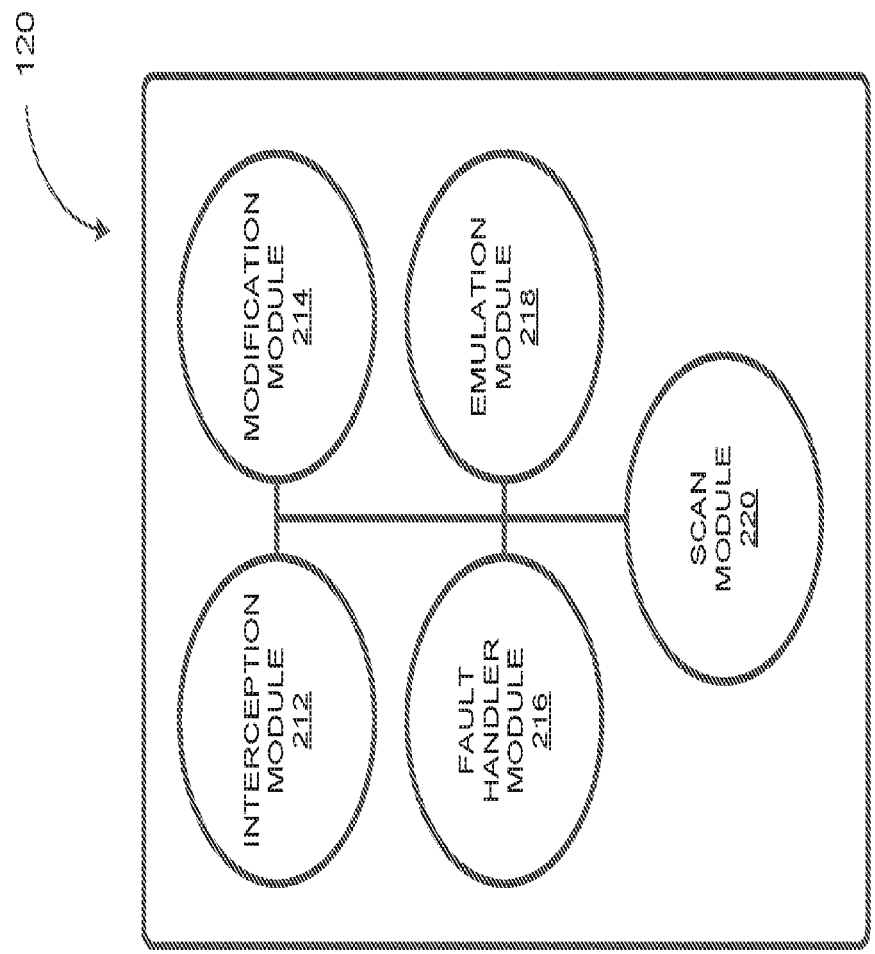
FIG. 2 depicts a block diagram illustrating a memory protection system, in accordance with some example embodiments.

FIG. 2 depicts a block diagram illustrating the memory protection system 120, in accordance with some example embodiments. Referring to FIGS. 1-2, the memory protection system 120 may include an interception module 212, a modification module 214, a fault handler module 216, an emulation module 218, and a scan module 220. It should be appreciated that the memory protection system 120 may include additional and/or different modules than shown without departing from the scope of the present disclosure. The memory protection system 120 can be deployed as computer software and/or dedicated circuitry at an endpoint device to detect processes that exhibit unwanted behavior (e.g., self-modifying behavior). Alternately or additionally, the memory protection system 120 may be available over a cloud platform to detect such processes.

In some example embodiments, the interception module 212 may be configured to intercept requests from one or more processes to an operating system. For example, the interception module 212 may intercept requests to the operating system 130 that originate from the first process 112, the second process 114, and/or the third process 116. The interception module 212 may intercept requests to allocate the first memory range 142 with a certain memory protection attribute and/or modify the existing memory protection attribute associated with the first memory range 142.

In some example embodiments, the modification module 214 may be configured to modify certain requests that have been intercepted by the interception module 212 including, for example, requests to allocate a memory range with read-write-execute memory protection attribute and/or requests to modify the existing memory protection attribute associated with a memory range to read-write-execute. For instance, the interception module 212 may intercept a request from the second process 114 that asks the operating system 130 to allocate the first memory range 142 with a read-write-execute memory protection attribute or to modify the memory protection attribute associated with the first memory range 142 to read-write-execute. The modification module 214 may modify the request such that the modified requests asks the operating system 130 to allocate the first memory range 142 with a read-write memory protection attribute or modify the memory protection attribute associated with the first memory range 142 to read-write. The memory protection system 120 may send the modified request to the operating system 130 instead of the original request that was intercepted by the interception module 212.

The fault handler module 216 may be configured to monitor for and/or detect faults at an operating system. According to some example embodiments, faults at the operating system may result from attempts by a process to perform operations with respect to a memory range that exceed and/or are inconsistent the memory protection attribute associated with the memory range. That is, the operating system may generate a fault when the process attempts to perform an operation (e.g., read, write, execute) with respect to a memory range but lacks the permission to perform such an operation.

For example, the second process 114 may attempt to execute instructions from the first memory range 142 even though the memory protection attribute associated with the first memory range 142 permits the second process 114 to only read from and write to the first memory range 142. Alternately or additionally, the memory protection attribute associated with the first memory range 142 may permit the second process 114 to read and execute instructions from the first memory range 142. However, the second process 114 may attempt to overwrite instructions in the first memory range 142 by writing to the first memory range. In both scenarios, the operating system 130 may generate a fault (e.g., memory access violation) because the second process 114 is attempting to perform an operation that is inconsistent with the memory protection attribute associated with the first memory range 142.

In some example embodiments, the emulation module 218 may be configured to emulate the effects of the instructions in a memory range that overwrites the same memory range when executed. For example, the emulation module 218 may emulate the effects of instructions that the second process 114 has previously written to the first memory range 142. The second process 114 may exhibit self-modifying behavior if executing these instructions overwrites at least a portion of the first memory range 142 and generates a different instruction stream at the first memory range 142. Emulating the effects of these instructions may include allowing the instructions to execute. As such, the first memory range 142 to be overwritten and a different instruction stream may be generated at the first memory range 142. The emulation module 218 may scan and/or cause a scan of the first memory range 142 to determine if any malicious instructions are present in the different instruction stream that is now at the first memory range 142. The emulation module 218 may determine, based on a result of the scan (e.g., presence or absence of malicious code), whether the self-modifying behavior exhibited by the second process 114 is malicious or benign.

In some example embodiments, the scan module 220 may be configured to scan a memory range for the presence of malicious instructions (e.g., shellcode). The scan module 220 may perform a scan when a process attempts to obtain execute permission with respect to a memory range and/or when a process exhibits self-modifying behavior. For instance, the scan module 220 may scan the first memory range 142 for the presence of malicious instructions when the interception module 212 intercepts a request from the second process 114 that asks the operating system 130 to allocate the first memory range 142 with a read-execute memory protection attribute and/or modify the existing memory protection attribute associated with the first memory range 142 to read-execute. The scan module 220 may scan a memory range (e.g., the first memory range 142) to determine whether the memory range is safe or unsafe. A memory range may be deemed safe when a result of a scan conducted by the scan module 220 indicates an absence of malicious code (e.g., shellcode) in the memory range. By contrast, the memory range may be deemed unsafe when the result of the scan by the scan module 220 indicates a presence of malicious code in the memory range.

Figure 3:
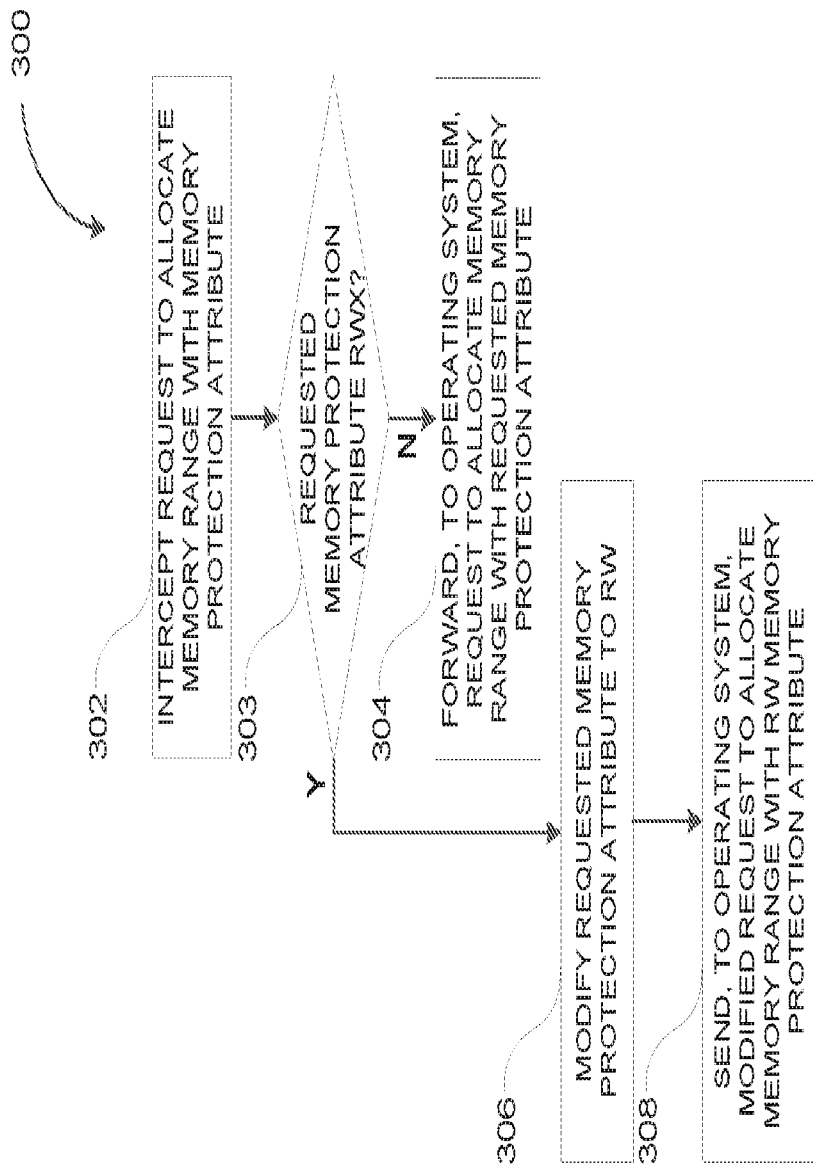
FIG. 3 depicts a flowchart illustrating a process for allocating a memory range with an initial memory protection attribute, in accordance with some example embodiments.

FIG. 3 depicts a flowchart illustrating a process 300 for allocating a memory range with an initial memory protection attribute, in accordance with some example embodiments. Referring to FIGS. 1-3, the process 300 may be performed by the memory protection system 120.

The memory protection system 120 may intercept a request from a process to allocate a memory range with a memory protection attribute (302). For example, the memory protection system 120 (e.g., the interception module 212) may intercept a request from the second process 114 to allocate the first memory range 142 with a certain memory protection attribute.

The memory protection system 120 may determine whether the requested memory protection attribute is read-write-execute (303). For example, the memory protection system 120 may determine whether the second process 114 is requesting the first memory range 142 to be allocated with a read-write-execute memory protection attribute. If the memory protection system 120 determines that the requested memory protection attribute is not read-write-execute (303-N), the memory protection system 120 may forward, to the operating system, the request to allocate the memory range with the memory protection attribute (304). For instance, the memory protection system 120 may determine that the second process 114 is requesting the first memory range 142 to be allocated with a read, read-write, or read-execute memory protection attribute. As such, the memory protection system 120 may forward the request to operating system 130 without any modification such that the first memory range 142 may be allocated to the second process 114 with the requested memory protection attribute (e.g., read, read-write, read-execute).

Alternately or additionally, if the memory protection system 120 determines that the requested memory protection attribute is read-write-execute (303-Y), the memory protection system 120 may modify the requested memory protection attribute to read-write (306). The memory protection system 120 may further send, to the operating system, a modified request to allocate the memory range with a read-write memory protection attribute (308). For instance, the memory protection system 120 may determine that the second process 114 is requesting the first memory range 142 to be allocated with a read-write-execute memory protection attribute. In response, the memory protection system 120 (e.g., the modification module 214) may modify the request to ask for the first memory range 142 to be allocated with a read-write memory protection attribute instead. The memory protection system 120 may send the modified request to the operating system 130 such that the first memory range 142 is allocated with a read-write memory protection attribute instead of the read-write-execute memory protection attribute that is originally requested by the second process 114. According to some example embodiments, the modification of the request is transparent to the second process 114. As such, the second process 114 may be unaware of its lack of permission to execute instructions from the first memory range 142. Any attempt by the second process 114 to execute instructions from the first memory range 142 may result in a fault (e.g., memory access violation) at the operating system 130.

Figure 4:
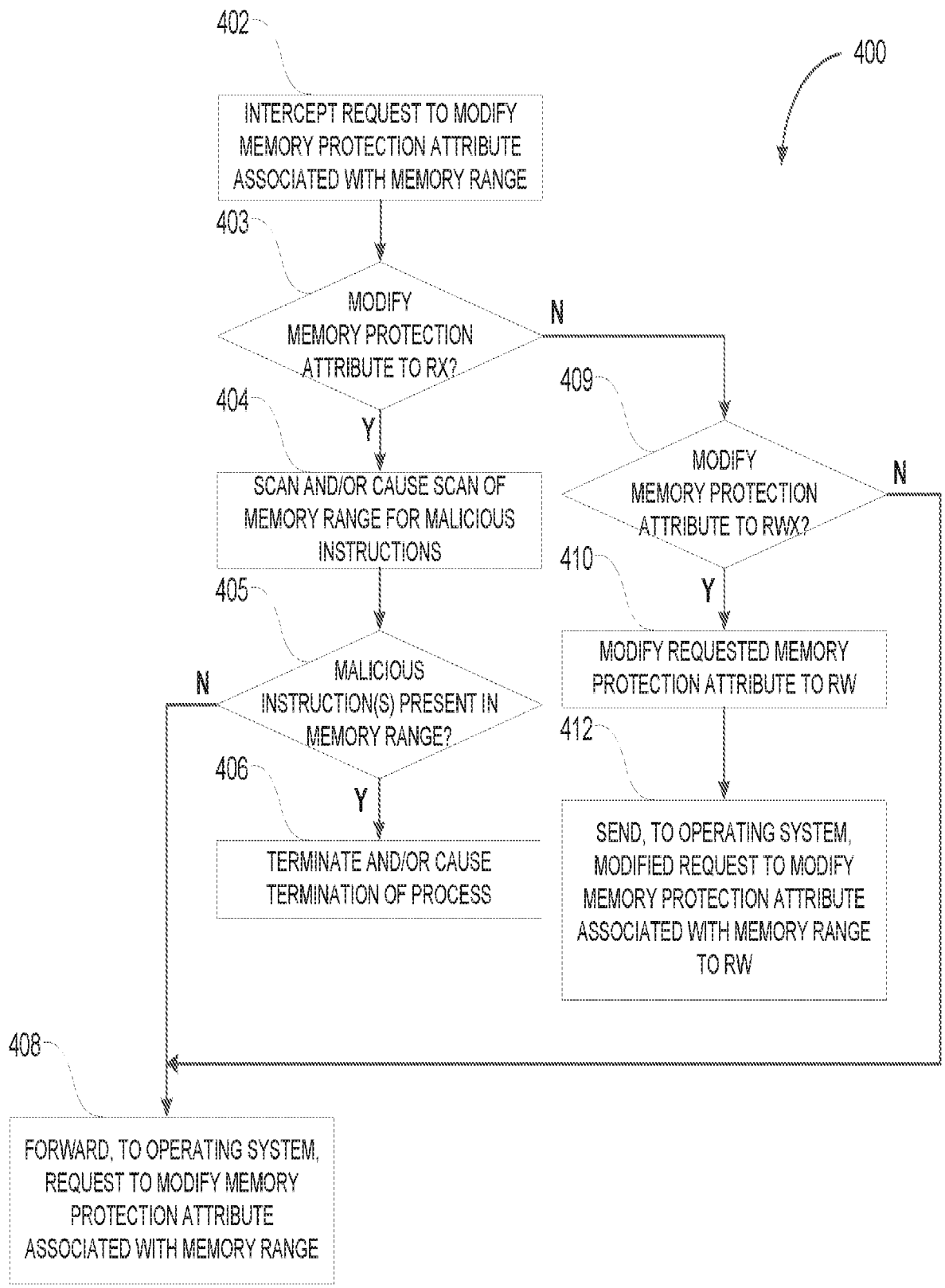
FIG. 4 depicts a flowchart illustrating a process for modifying a memory protection attribute associated with a memory range, in accordance with some example embodiments.

FIG. 4 depicts a flowchart illustrating a process 400 for modifying a memory protection attribute associated with a memory range, in accordance with some example embodiments. Referring to FIGS. 1-2 and 4, the process 400 may be performed by the memory protection system 120.

The memory protection system 120 may intercept a request to modify the memory protection attribute associated with a memory range (402). For example, the memory protection system 120 (e.g., the interception module 212) may intercept a request from the second process 114 to modify the existing memory protection attribute associated with the first memory range 142 to a different memory protection attribute.

The memory protection system 120 may determine whether the request is to modify the memory protection attribute associated with the memory range to read-execute (403). If the memory protection system 120 determines that the request is to modify the memory protection attribute associated with the memory range to read-execute (403-Y), the memory protection system 120 may scan and/or cause a scan of the memory range for malicious instructions (404). For instance, when the memory protection system 120 determines that the second process 114 attempting to modify the existing memory protection attribute associated with the first memory range 142 to read-execute, the memory protection system 120 and/or the scan module 220 may perform a scan of the first memory range 142 to determine whether malicious instructions, such as shellcode and/or the like, are present in the first memory range 142. Alternately or additionally, the memory protection system 120 may cause the operating system 130 to perform a scan of the first memory range 142 for the presence of malicious instructions.

If a result of the scan indicates that one or more malicious instructions are present in the memory range (405-Y), the memory protection system 120 may terminate and/or cause a termination of the process (406). For instance, if a result of scanning the first memory range 142 indicates the presence of one or more malicious instructions, such as shellcode and/or the like, the memory protection system 120 may terminate the second process 114 and/or cause the operating system 130 to terminate the second process 114.

Alternately or additionally, the result of the scan may indicate no malicious instructions are present in the memory range (405-N). As such, the memory protection system 120 may forward, to an operating system, the request modify the memory protection attribute associated with the memory range (408). For example, if the result scanning the first memory range 142 indicates an absence of malicious instructions (e.g., shellcode), the memory protection system 120 may forward, to the operating system 130, the request from the second process 114 to modify the memory protection attribute associated with the first memory range 142 to read-execute. Forwarding the request to the operating system 130 may cause the operating system 130 to modify, as requested by the second process 114, the memory protection attribute associated with the first memory range 142 to read-execute. Accordingly, the second process 114 may then be able to read and execute instructions from the first memory range 142.

Alternately or additionally, if the memory protection system 120 determines that the request is not to modify the memory protection attribute associated with the memory range to read-execute, the memory protection system 120 may determine whether the request is to modify the memory protection attribute associated with the memory range to read-write-execute (409).

If the memory protection system 120 determines that the request is not to modify the memory protection attribute associated with the memory range to read-write-execute (409-N), the memory protection system 120 may forward, to the operating system, the request to modify the memory protection attribute associated with the memory range (408). For example, the memory protection system 120 may determine that the second process 114 is requesting to modify the memory protection attribute associated with the first memory range 142 to either read or read-write. As such, the memory protection system 120 may forward the request from the second process 114 to the operating system 130 such that the memory protection attribute associated with the first memory range 142 may be modified to read or read-write.

Alternately or additionally, if the memory protection system 120 determines that the request is to modify the memory protection attribute associated with the memory range to read-write-execute (409-Y), the memory protection system 120 may modify the requested memory protection attribute to read-write (410). The memory protection system 120 may further send, to the operating system, a modified request to modify the memory protection attribute associated with the memory range to read-write (412).

For example, the memory protection system 120 may determine that the second process 114 is requesting modify the memory protection attribute associated with the first memory range 142 to read-write-execute. As such, the memory protection system 120 (e.g., the modification module 214) may modify the request to ask the memory protection attribute associated with the first memory range 142 to be modified to read-write instead. The memory protection system 120 may send the modified request to the operating system 130 such that the memory protection attribute associated with the first memory range 142 is modified to read-write instead of the read-write-execute that is originally requested by the second process 114. According to some example embodiments, the modification of the request is transparent to the second process 114. As such, the second process 114 may be unaware of its lack of permission to execute instructions from the first memory range 142. Any attempt by the second process 114 to execute instructions from the first memory range 142 may result in a fault (e.g., memory access violation) at the operating system 130.

Figure 5:
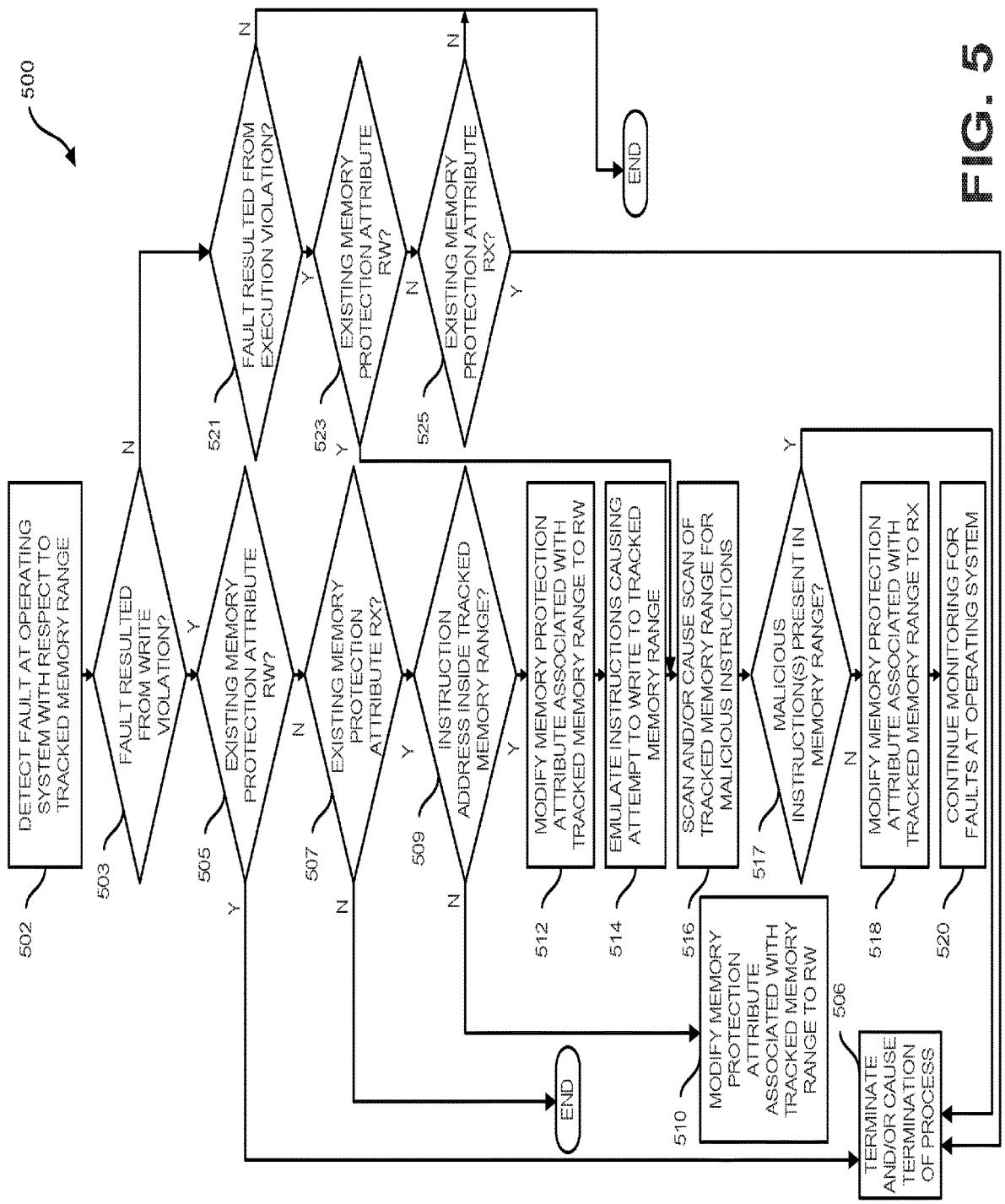
FIG. 5 depicts a flowchart illustrating a process for handling faults resulting from violations of the memory protection attribute associated with a memory block, in accordance with some example embodiments.

FIG. 5 depicts a flowchart illustrating a process 500 for handling faults resulting from violations of the memory protection attribute associated with a memory block, in accordance with some example embodiments. Referring to FIGS. 1-2 and 5, the process 500 may be performed by the memory protection system 120.

The memory protection system 120 may detect a fault at an operating system with respect to a tracked memory range (502). In some example embodiments, the memory protection system 120 may track a memory range when a process has attempted to allocate the memory range with a read-write-execute memory protection attribute and/or when the process has attempted to modify the memory protection attribute of the memory range to read-write-execute. Thus, as an example, the memory protection system 120 may track the first memory range 142 when the second process 114 requests to allocate the first memory range 142 with a read-write-execute memory protection attribute and/or when the second process 114 requests to modify the memory protection attribute associated with the first memory range 142 to read-write-execute. The memory protection system 120 may detect when a fault occurs at the operating system with respect to the first memory range 142.

The memory protection system 120 may determine whether the fault resulted from a write violation by a process (503). For example, the operating system 130 may generate a fault (e.g., a memory access violation) when the second process 114 attempts to write to the first memory range 142 when the memory protection attribute associated with the first memory range 142 does not permit writes.

The memory protection system 120 may determine that the fault resulted from a write violation by a process (503-Y). Accordingly, the memory protection system 120 may determine whether the existing memory protection attribute associated with the tracked memory range is read-write (505). If the memory protection system 120 determines that the existing memory protection attribute associated with the tracked memory range is read-write (505-Y), then the memory protection system 120 may terminate and/or cause a termination of the process (506). For example, the memory protection system 120 may determine that memory protection attribute associated with the first memory range 142 permits the second process to write to the first memory range 142. As such, the memory protection system 120 may terminate and/or may cause the operating system 130 to terminate the second process 114 if attempts by the second process 114 to write to the first memory range 142 causes a write violation at the operating system 130.

Alternately or additionally, if the memory protection system 120 determines that the existing memory protection attribute associated with the tracked memory range is not read-write (505-N), the memory protection system 120 may determine whether the existing memory protection attribute associated with the tracked memory range is read-execute (507). If the memory protection system 120 determines that the existing memory protection attribute associated with the tracked memory range is not read-execute (507-N), the process 500 may end. For example, if the memory protection system 120 determines that the existing memory protection attribute associated with the first memory range 142 is not read-execute, then the first memory range 142 is associated with a read only memory protection attribute. As such, any self-modifying behavior that the second process 114 may have cannot be manifest on the first memory range 142 because the second process 114 lacks the permission to write to the first memory range 142. Moreover, the second process 114 also may be unable to execute any malicious instructions from the first memory range 142. Thus, the process 500 may terminate at this point and may restart again at operation 502 when another fault occurs at the operating system 130.

If the memory protection system 120 determines that the existing memory protection attribute associated with the tracked memory range is read-execute (507-Y), the memory protection system 120 may determine whether the address of the instruction that the process is attempting to write is within the tracked memory range (509). For example, if the memory protection system 120 determines that the existing memory protection attribute associated with the first memory range 142 is read-execute, then an attempt by the second process 114 to write to the first memory range 142 may be indicative of self-modifying behavior. Thus, the memory protection system 120 may determine whether this self-modifying behavior is malicious or benign.

If the memory protection system 120 determines that the address of the instruction that the process is attempting to write is not within the tracked memory range (509-N), the memory protection system 120 may modify the memory protection attribute associated with the tracked memory range to read-write (510). For example, if the memory protection system 120 determines that the address of the instruction being written by the second process 114 is not within the first memory range 142, the second process 114 is not exhibiting any self-modifying behavior since it is not attempting to overwrite the first memory range 142. As such, the memory protection system 120 may modify the memory protection attribute associated with the first memory range 142 to read-write. For example, the memory protection system 120 may send, to the operating system 130, a request to modify the memory protection attribute associated with the first memory range 142 to read-write, thereby allowing the second process 114 to read from and write to the first memory range 142.

If the memory protection system 120 determines that the address of the instruction that the process is attempting to write is within the tracked memory range (509-Y), the memory protection system 120 may modify the memory protection attribute associated with the tracked memory range to read-write (512). The memory protection system 120 may further emulate the one or more instructions that are causing the attempt to write to the tracked memory range (514). For example, the memory protection system 120 may determine that the second process 114 exhibits self-modifying behavior when the second process 114 attempts to overwrite the first memory range 142. The memory protection system 120 may determine whether the self-modifying behavior exhibited by the second process 114 is malicious or benign by at least emulating the instructions that the second process 114 has previously written to the first memory range 142 and that overwrites the first memory range 142 when executed. Emulating these instructions may include allowing the instructions to execute and a different instruction stream to be generated at the first memory range 142.

The memory protection system 120 may scan and/or cause a scan of the tracked memory range for malicious instructions (516). For example, the memory protection system 120 and/or the scan module 220 may perform a scan of the first memory range 142 to determine whether the second process 114 has overwritten the first memory range 142 with a different instruction stream that contains one or more malicious instructions. Alternately or additionally, the memory protection system 120 may cause the operating system 130 to perform a scan of the first memory range 142 for the presence of malicious instructions.

If a result of the scan indicates that one or more malicious instructions are present in the tracked memory range (517-Y), the memory protection system 120 may terminate and/or cause a termination of the process (506). For instance, a result of scanning the first memory range 142 may indicate that the second process 142 has overwritten the first memory range 142 with a different instruction stream that contains one or more malicious instructions, such as shellcode and/or the like. As such, the memory protection system 120 may terminate the second process 114 and/or cause the operating system 130 to terminate the second process 114.

Alternately or additionally, the result of the scan may indicate no malicious instructions are present in the tracked memory range (517-N). As such, the memory protection system 120 may modify the memory protection attribute associated with the tracked memory range back to read-execute (518) and continue to monitor for faults at the operating system (520). For example, if the result scanning the first memory range 142 indicates an absence of malicious instructions (e.g., shellcode), the memory protection system 120 may modify the memory protection attribute associated with the first memory range 142 back to read-execute. For example, the memory protection system 120 may send, to the operating system 130, a request to modify the memory protection attribute associated with the first memory range 142 to read-execute. The memory protection system 120 may modify the memory protection attribute associated with the first memory range 142 back to read-execute so that any subsequent attempts by the second process 114 to write to the first memory range 142 will cause another fault at the operating system 130. The memory protection system 120 may continue to monitor for faults at the operating system 130 in order to be able to detect when the second process 114 again exhibits self-modifying behavior.

If at operation 503, the memory protection system 120 determined that the fault at the operating system did not result from a write violation (503-N), the memory protection system 120 may determine whether the fault at the operating system resulted from an execution violation (521). For example, if the fault at the operating system 130 is not the result of an unauthorized attempt by the second process 114 to write to the first memory range 142, the memory protection system 120 may determine whether the fault at the operating system 130 resulted from an unauthorized attempt by the second process 114 to execute from the first memory range 142.

The memory protection system 120 may determine that the fault at the operating system did not result from an execution violation (521-N). As such, the process 500 may end at operation 521. For example, if the memory protection system 120 determines that the fault at the operating system 130 did not result from an unauthorized attempt by the second process 114 to execute from the first memory range 142, the memory protection system 120 may determine that the fault did not result from any events that may indicate self-modifying behavior. Accordingly, the process 500 may end and may be restarted again when the memory protection system 120 detects another fault at the operating system 130.

Alternately or additionally, if the memory protection system 120 determines that the fault at the operating system did result from an execution violation (521-Y), the memory protection system 120 may determine whether the existing memory protection attribute associated with the tracked memory range is read-write (523). The memory protection system 120 may determine that the existing memory protection attribute associated with the tracked memory range is read-write (523-Y). As such, the memory protection system 120 may scan and/or cause a scan of the tracked memory range for malicious instructions (516). For instance, if the memory protection system 120 determines that the existing memory protection attribute associated with the first memory range 142 is read-write, the memory protection system 120 may determine whether the second process 114 is attempting to execute malicious instructions.

Accordingly, if the result of the scan indicates that one or more malicious instructions are present in the tracked memory range (517-Y), the memory protection system 120 may terminate and/or cause a termination of the process (506). For instance, if a result of scanning the first memory range 142 indicates the presence of one or more malicious instructions, such as shellcode and/or the like, the memory protection system 120 may terminate the second process 114 and/or cause the operating system 130 to terminate the second process 114 as the second process 114 is attempting to execute malicious instructions.

Alternately or additionally, if the result of the scan indicates that no malicious instructions are present in the tracked memory range (517-N), the memory protection system 120 may modify the memory protection attribute associated with the tracked memory range to read-execute (518). Furthermore, the memory protection system 120 may continue to monitor for faults at the operating system (520). For example, if the result scanning the first memory range 142 indicates an absence of malicious instructions (e.g., shellcode), the memory protection system 120 may modify the memory protection attribute associated with the first memory range 142 to read-execute, thereby allowing the second process 114 to execute the instructions from the first memory range 142. The memory protection system 120 may continue to monitor for faults at the operating system 130. For instance, the memory protection system 120 may monitor for faults at the operating system 130 that indicate when the second process 114 attempts to write to the first memory range 142.

If at operation 523 the memory protection system 120 determines that the existing memory protection attribute associated with the tracked memory range is not read-write (523-N), the memory protection system 120 may determine whether the existing memory protection attribute associated with the tracked memory range is read-execute (525). If the memory protection system 120 determines that the existing memory protection attribute associated with the tracked memory range is read-execute (525-Y), the memory protection system 120 may terminate and/or cause a termination of the process (506). For example, the memory protection system 120 may determine that memory protection attribute associated with the first memory range 142 permits the second process to execute from the first memory range 142. As such, the memory protection system 120 may terminate and/or may cause the operating system 130 to terminate the second process 114 if attempts by the second process 114 to execute instructions from the first memory range 142 causes an execution violation at the operating system 130.

If the memory protection system 120 determines that the existing memory protection attribute associated with the tracked memory range is not read-execute (525-N), the process 500 may end. For example, if the memory protection system 120 determines that the existing memory protection attribute associated with the first memory range 142 is not read-execute, then the first memory range 142 is associated with a read only memory protection attribute. As such, any self-modifying behavior that the second process 114 may have cannot be manifest on the first memory range 142 because the second process 114 lacks the permission to write to the first memory range 142. Moreover, the second process 114 also may be unable to execute any malicious instructions from the first memory range 142. Thus, the process 500 may terminate at this point and may restart again at operation 502 when another fault occurs at the operating system 130.

Figure 6:
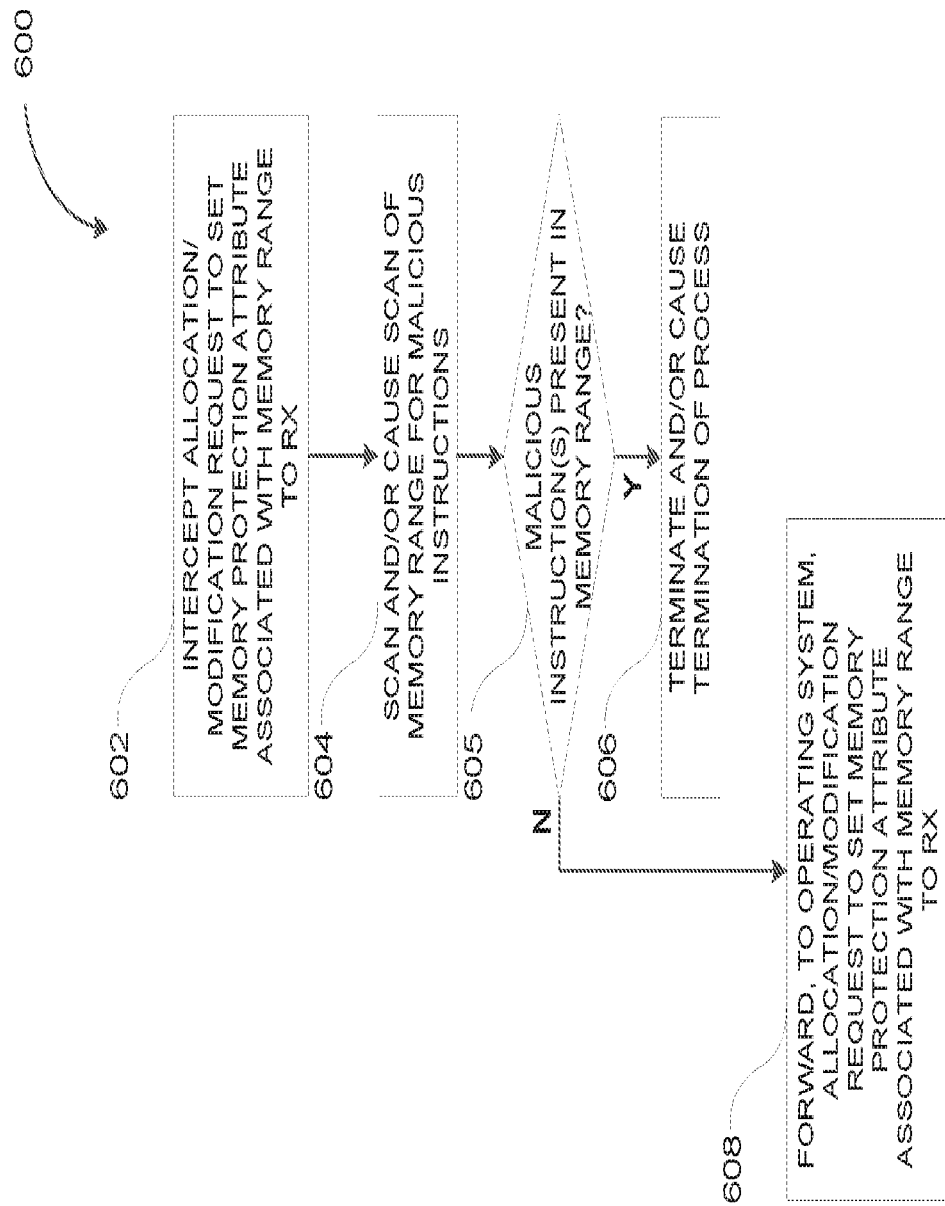
FIG. 6 depicts a flowchart illustrating a process for protecting executable memory space, in accordance with some example embodiments.

FIG. 6 depicts a flowchart illustrating a process 600 for protecting executable memory space, in accordance with some example embodiments. Referring to FIGS. 1-2 and 6, the process 600 may be performed by the memory protection system 120.

The memory protection system 120 may intercept an allocation or a modification request from a process to configure a memory range to with a read-execute memory protection attribute (602). For example, the memory protection system 120 (e.g., the interception module 212) may intercept a request from the second process 114 to allocate the first memory range 142 with a read-execute memory protection attribute. Alternately or additionally, the memory protection system 120 (e.g., the interception module 212) may intercept a request from the second process 114 to modify the memory protection attribute associated with the first memory range 142 to read-execute. The request from second process 114 may be destined for the operating system 130. Configuring the first memory range 142 with the memory protection attribute requested by the second process 114 may allow the second process 114 to read and execute instructions from the first memory range 142.

In response to the request, the memory protection system 120 may scan and/or cause a scan of the memory range for the presence of malicious instructions (604). For instance, when the memory protection system 120 determines that the second process 114 is attempting to read and execute instructions from the first memory range 142, the memory protection system 120 and/or the scan module 220 may perform a scan of the first memory range 142 to determine whether malicious instructions, such as shellcode and/or the like, are present in the first memory range 142. Alternately or additionally, the memory protection system 120 may cause the operating system 130 to perform a scan of the first memory range 142 for the presence of malicious instructions.

If a result of the scan indicates that one or more malicious instructions are present in the memory range (605-Y), the memory protection system 120 may terminate and/or cause a termination of the process (606). For instance, if a result of scanning the first memory range 142 indicates the presence of one or more malicious instructions, such as shellcode and/or the like, the memory protection system 120 may terminate the second process 114 and/or cause the operating system 130 to terminate the second process 114.

Alternately or additionally, the result of the scan may indicate no malicious instructions are present in the memory range (605-N). As such, the memory protection system 120 may forward, to an operating system, the allocation or modification request to configure the memory range with a read-execute memory protection attribute (608). For example, if the result scanning the first memory range 142 indicates an absence of malicious instructions (e.g., shellcode), the memory protection system 120 may forward, to the operating system 130, the request from the second process 114. Forwarding the request to the operating system 130 may cause the operating system 130, as specified by the request, to configure the first memory range 142 with a read-execute memory protection attribute. Accordingly, the second process 114 may then be able to read and execute instructions from the first memory range 142.

According to some example embodiments, the memory protection system 120 may perform the process 600 in a manner that is transparent to the second process 114. For instance, the second process 114 may be unaware of the interception of the allocation or modification request to configure the memory protection attribute of the first memory range 142. The second process 114 may further be unaware of the scanning of the first memory range 142 for the presence of malicious code prior to configuring the memory protection attribute associated with the first memory range 142.

Figure 7:
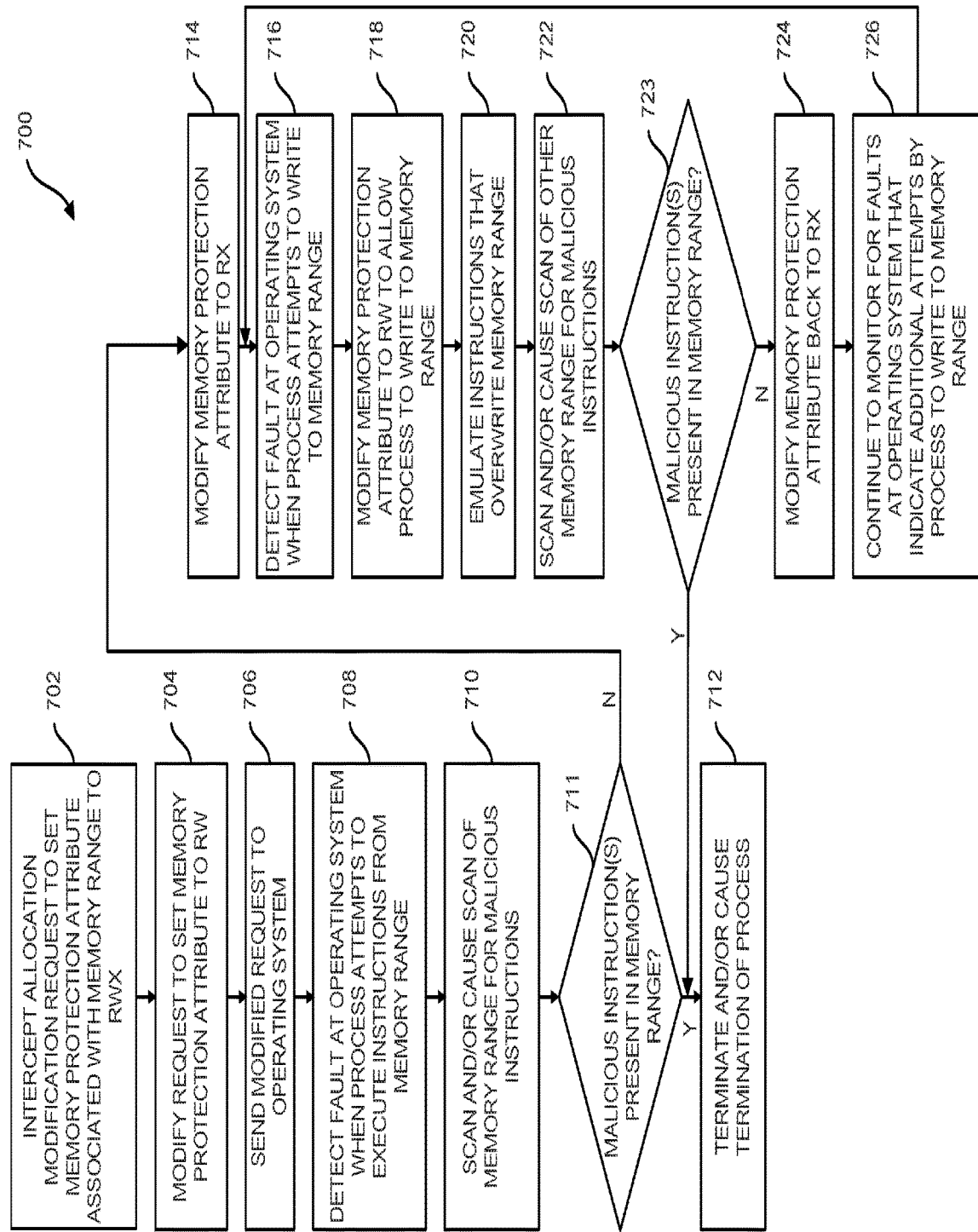
FIG. 7 depicts a flowchart illustrating a process for detecting self-modifying behavior, in accordance with some example embodiments.

FIG. 7 depicts a flowchart illustrating a process 700 for detecting self-modifying behavior, in accordance with some example embodiments. Referring to FIGS. 1-2 and 7, the process 700 may be performed by the memory protection system 120.

The memory protection system 120 may intercept an allocation or modification request from a process to configure a memory range with a read-write-execute memory protection attribute (702). For example, the memory protection system 120 (e.g., the interception module 212) may intercept a request from the second process 114 to allocate the first memory range 142 with a read-write-execute memory protection attribute. Alternately or additionally, the memory protection system 120 (e.g., the interception module 212) may intercept a request from the second process 114 to modify the memory protection attribute associated with the first memory range 142 to read-write-execute. The request from second process 114 may be destined for the operating system 130. Configuring the memory protection attribute associated with the first memory range 142 as requested may allow the second process 114 to write instructions to the first memory range 142 and later overwrite these instructions with different instructions. The second process 114 may further be able to read and execute instructions from the first memory range 142. Thus, the memory protection system 120 may begin tracking the first memory range 142 when the memory protection system 120 intercepts an allocation or modification request that configures the memory protection attribute associated with the first memory range 142 to read-write-execute.

In response to the allocation or modification request, the memory protection system 120 may modify the request to configure the memory range with a read-write memory protection attribute (704). The memory protection system 120 may further send, to the operating system, the modified request (706). For instance, the memory protection system 120 (e.g., the modification module 214) may modify the request from the second process 114 to configure the memory protection attribute associated with the first memory range 142 to read-write. The memory protection system 120 may send, to the operating system 130, the modified request instead of the original request from the second process 114. Accordingly, the operating system 130 may configure the memory protection attribute associated with the first memory range 142 to read-write instead of the read-write-execute that is originally requested by the second process 114. Thus, the second process 114 may be able read instructions to the first memory range 142 as well as write instructions from the first memory range 142. However, the second process 114 may be unable to execute instructions from the first memory range 142 without triggering a fault at the operating system 130.

The memory protection system 120 may detect a fault at the operating system when the process attempts to execute instructions from the memory space (708). For example, the memory protection system 120 (e.g., the fault handler module 216) may monitor for and/or detect faults at the operating system 130. According to some example embodiments, the interception and modification of the request (e.g., at operations 702-706) may be transparent to the second process 114. As such, the second process 114 may be unaware of the lack of execute permission with respect to the first memory range 142 and may request to execute instructions from the first memory range 142. The attempt by the second process 114 to execute instructions from the first memory range 142 may cause a fault (e.g., memory access violation) at the operating system 130 because the attempt to execute is inconsistent with the memory protection attribute (e.g., read-write only) associated with the first memory range 142.

In response to detecting the fault at the operating system, the memory protection system 120 may scan and/or cause a scan of the memory range for the presence of malicious instructions (710). For instance, in response to the fault (e.g., memory access violation) at the operating system 130, the memory protection system 120 (e.g., the scan module 220) may perform a scan of the first memory range 142 to determine whether malicious instructions (e.g., shellcode) are present in the first memory range 142. Alternately or additionally, the memory protection system 120 may cause the operating system 130 to perform a scan of the first memory range 142 for the presence of malicious instructions.

If a result of the scan indicates that one or more malicious instructions are present in the memory range (711-Y), the memory protection system 120 may terminate and/or cause a termination of the process (712). For instance, if a result of scanning the first memory range 142 indicates the presence of one or more malicious instructions, such as shellcode and/or the like, the memory protection system 120 may terminate the second process 114 and/or cause the operating system 130 to terminate the second process 114.

Alternately or additionally, if the result of the scan indicates that no malicious instructions are present in the memory range (711-N), the memory protection system 120 may configure the memory range with a read-execute memory protection attribute (714). For example, if the result scanning the first memory range 142 indicates an absence of malicious instructions, the memory protection system 120 may send, to the operating system 130, a request to configure the memory protection attribute associated with the first memory range 142 to read-execute. Configuring the memory protection attribute associated with the first memory range 142 to read-execute allows the second process 114 to read and execute instructions from the first memory range 142. However, absent write permission, the second process 114 may be unable to overwrite instructions in the first memory range 142 (e.g., by writing instructions to the first memory range 142) without causing a fault at the operating system 130.

The memory protection system 120 may detect a fault at the operating system when the process attempts to write to the memory range (716). For instance, the second process 114 may exhibit self-modifying behavior when the second process 114 attempts to overwrite the instructions in the first memory range 142 by writing again to the first memory range 142.

In response to the fault at the operating system, the memory protection system 120 may modify the memory protection attribute associated with the memory range to read-write to allow the process to write to the memory range (718). The memory protection system 120 may further emulate the effects of the instructions that overwrite the memory range (720). For instance, the fault at the operating system 130 may indicate, to the memory protection system 120, that the second process 114 exhibits self-modifying behavior. The second process 114 may exhibit self-modifying behavior when the second process 114 attempts to overwrite the first memory range 142 by writing again to the first memory range 142. That is, executing one or more instructions that the second process 114 has previously written to the first memory range 142 may overwrite at least a portion of the first memory range 142 and generate a different instruction stream at the first memory range 142. As such, the memory protection system 120 (e.g., the emulation module 216) may emulate the effects of these instructions by modifying the memory protection attribute associated with the first memory range 142 to temporarily allow the second process 114 to write to the first memory range 142. In doing so, the second process 114 may overwrite at least a portion of the first memory range 142 and generate a different instruction stream at the first memory range 142.

The memory protection system 120 may scan and/or cause a scan of the memory range for the presence of malicious instructions (722). For instance, the memory protection system 120 and/or the scan module 220 may perform a scan of the first memory range 142 to determine whether the second process 114 has overwritten the first memory range 142 with malicious instructions, such as shellcode and/or the like. Alternately or additionally, the memory protection system 120 may cause the operating system 130 to perform a scan of the first memory range 142 for the presence of malicious instructions. The presence or absence of malicious instructions in the first memory range 142 may indicate whether the self-modifying behavior of the second process 114 is malicious or benign.

If a result of the scan indicates that one or more malicious instructions are present in the memory range (723-Y), the memory protection system 120 may terminate and/or cause a termination of the process (712). For instance, if a result of scanning the first memory range 142 indicates that the second process 114 has overwritten the first memory range 142 with a different instruction stream that includes one or more malicious instructions (e.g., shellcode), the memory protection system 120 may terminate the second process 114 and/or cause the operating system 130 to terminate the second process 114.

Alternately or additionally, if the result of the scan indicates that no malicious instructions are present in the memory range (723-N), the memory protection system 120 may modify the memory protection attribute associated with the memory range back to read-execute (724). The memory protection system 120 may continue to monitor for faults at the operating system that indicate additional attempts by the process to write to the memory range (726). If the result scanning the first memory range 142 indicates that the second process 114 did not overwrite the first memory range 142 with malicious instructions, the memory protection system 120 may modify the memory protection attribute associated with the first memory range 142 back to read-execute. For example, the memory protection system 120 may send, to the operating system 130, a request to modify the memory protection attribute associated with the first memory range 142 to read-execute. The memory protection system 120 may modify the memory protection attribute associated with the first memory range 142 back to read-execute so that any subsequent attempts by the second process 114 to write to the first memory range 142 will cause another fault at the operating system 130. The memory protection system 120 may continue to monitor for faults at the operating system 130 in order to be able to detect when the second process 114 again exhibits self-modifying behavior.

According to some example embodiments, the memory protection system 120 may perform the process 700 in a manner that is transparent to the second process 114. For instance, as noted above, the second process 114 may be unaware of the interception and modification of the allocation or modification request to configure the memory protection attribute associated with the first memory range 142. Furthermore, the second process 114 may be unaware of the modification of the memory protection attribute associated with the first memory range 142 (e.g., to read and execute permission) as well as the emulation of the instructions written by the second process 114.

The memory protection system 120 can be deployed as computer software and/or dedicated circuitry at an endpoint device. As such, the memory protection system 120 may perform one or more of the process 300, the process 400, the process 500, the process 600, and the process 700 at the endpoint device to detect processes that exhibit unwanted behavior (e.g., self-modifying behavior). Alternately or additionally, the memory protection system 120 may be available over a cloud platform to detect such processes. Accordingly, the process 300, the process 400, the process 500, the process 600, and/or the process 700 may be performed at the cloud platform to detect unwanted behavior at an endpoint device.

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital MM image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

The invention claimed is:

1. A system, comprising:
at least one processor; and
at least one memory including program code which when executed by the at least one processor provides operations comprising:
causing a request sent from a process being executed by a computing device that is directed to an operating system executed by the computing device to be intercepted prior to it being received by the operating system, the request requesting that a portion of memory of the computing device be configured with a memory protection that allows the process to perform a memory operation on the portion of the memory, the operating system being configured to allocate a block or range of memory to the process with different memory protection attributes in response to the request if such request were not intercepted;
scanning the portion of the memory to determine that instructions contained therein are malicious;
responding, in response to receiving the request and the determination that the memory contains malicious instructions, to the request with a grant;
configuring the portion of memory with a reduced memory protection attribute that prohibits, contrary to the requested memory protection attribute, the memory operation from being performed by the process on the portion of the memory; and
detecting when the process violates the reduced memory protection attribute by at least attempting, in accordance with the grant, the memory operation prohibited by the reduced memory protection attribute.

2. The system of claim 1, wherein the requested memory protection attribute allows the process to read, write, and execute at the portion of memory.

3. The system of claim 2, wherein the reduced memory protection attribute prohibits the process from executing at the portion of memory but allows the process to read and write at the portion of memory.

4. The system of claim 3, wherein the process violates the reduced memory protection attribute by at least attempting to execute at the portion of the memory.

5. The system of claim 4, wherein the operations further comprise:
in response to detecting that the process violated the reduced memory protection attribute by at least attempting to execute at the portion of the memory, determining whether one or more instructions previously written by the process to the portion of memory are malicious or benign.

6. The system of claim 5, wherein the scanning is performed by a memory protection system.

7. The system of claim 5, wherein the operations further comprise:
modifying the reduced memory protection attribute to prohibit the process from writing at the portion of memory but to allow the process to read and execute from the portion of memory, when the one or more instructions previously written by the process to the portion of memory are determined to be benign; and
detecting when the process violates the reduced memory protection attribute by at least attempting to write at the portion of the memory.

8. The system of claim 7, wherein the attempt to write at the portion of the memory results from executing the one or more instructions previously written by the process to the portion of memory.

9. The system of claim 8, wherein the process exhibits self-modifying behavior when the execution of the one or more instructions previously written by the process to the portion of memory results in the attempt to write at the portion of the memory.

10. The system of claim 9, wherein the operations further comprise:
in response to detecting that the process has violated the reduced memory protection attribute by at least attempting to write at the portion of the memory, emulating the one or more instructions previously written by the process to the portion of memory.

11. The system of claim 10, wherein the emulating of the one or more instructions includes:
modifying the reduced memory protection attribute to allow the process to write at the portion of memory, the allowance enabling the process to generate a different instruction stream at the portion of memory; and
determining whether the different instruction stream is malicious or benign.

12. The system of claim 11, wherein the operations further comprise:
modifying the reduced memory protection attribute to allow the process to read and execute at the portion of memory but to prohibit the process from writing at the portion of memory, when the different instruction stream is determined to be benign.

13. The system of claim 11, wherein the operations further comprise:
terminating the process, when the different instruction stream is determined to be malicious.

14. The system of claim 1, wherein the request comprises a request to allocate the portion of memory with the requested memory protection attribute or a request to modify an existing memory protection attribute of the portion of memory to the requested memory protection attribute.

15. The system of claim 1, wherein the request is sent from the process to an operating system, and wherein the receiving of the request comprises intercepting the request sent from the process.

16. The system of claim 15, wherein configuring the portion of the memory with the reduced memory protection attribute includes sending, to the operating system, a different request to configure the portion of memory with the reduced memory protection, the different request being sent to the operating system instead of the intercepted request.

17. The system of claim 15, wherein the detecting comprises detecting a fault generated at the operating system, the fault indicating that the process violated the reduced memory protection attribute by at least attempting the memory operation prohibited by the reduced memory protection attribute.

18. A computer-implemented method comprising:
causing a request sent from a process being executed by a computing device that is directed to an operating system executed by the computing device to be intercepted prior to it being received by the operating system, the request requesting that a portion of memory of the computing device be configured with a memory protection that allows the process to perform a memory operation on the portion of the memory;
receiving the request;
scanning the portion of the memory to determine that instructions contained therein are malicious;
responding, in response to receiving the request and the determination that the memory contains malicious instructions, with a grant to the process without notifying the operating system such that the process remains unaware of the interception of the request and a configuration of a reduced memory protection attribute;
configuring, in response and subsequent to receiving the request, the portion of memory with a reduced memory protection attribute that prohibits, contrary to the requested memory protection attribute, the memory operation from being performed by the process on the portion of the memory; and
detecting when the process violates the reduced memory protection attribute by at least attempting, in accordance with the grant, the memory operation prohibited by the reduced memory protection attribute.

19. The method of claim 18, wherein the requested memory protection attribute allows the process to read, write, and execute at the portion of memory.

20. A non-transitory computer product storing instructions which, when executed by at least one data processor, result in operations comprising:
causing a request sent from a process being executed by a computing device that is directed to an operating system executed by the computing device to be intercepted prior to it being received by the operating system, the request requesting that a portion of memory of the computing device be configured with a memory protection that allows the process to perform a memory operation on the portion of the memory, the operating system being configured to allocate a block or range of memory to the process with different memory protection attributes in response to the request if such request were not intercepted;
scanning the portion of the memory to determine that instructions contained therein are malicious;
responding, in response to receiving the request and the determination that the memory contains malicious instructions, to the request with a grant;
configuring the portion of memory with a reduced memory protection attribute that prohibits, contrary to the requested memory protection attribute, the memory operation from being performed by the process on the portion of the memory; and
detecting when the process violates the reduced memory protection attribute by at least attempting, in accordance with the grant, the memory operation prohibited by the reduced memory protection attribute.

* * * * *